March 10, 1953 I. U. WHITE ET AL 2,630,798
RESPIRATORY QUOTIENT AND METABOLISM METER
Filed July 1, 1948
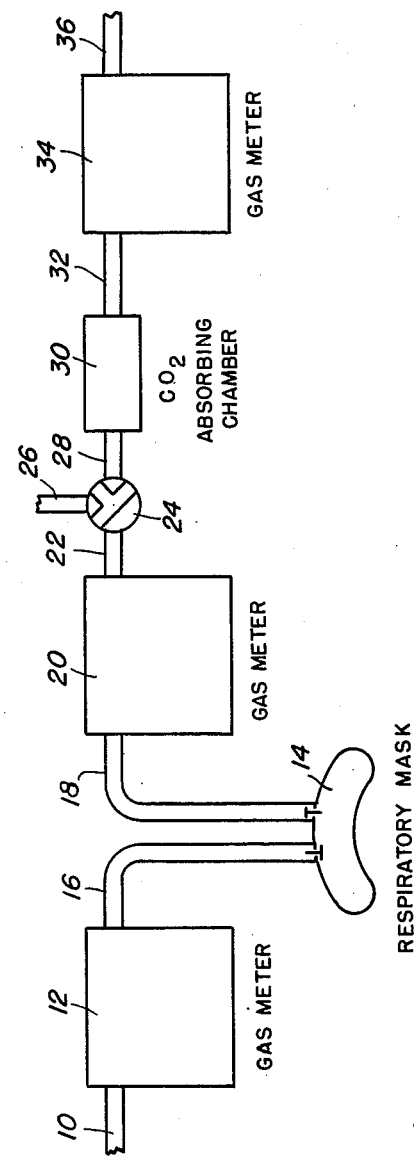
Ira U. White
Roscoe G. Bartlett, Jr.
INVENTORS Patented Mar. 10, 1953

2,630,798

UNITED STATES PATENT OFFICE 2,630,798

RESPIRATORY QUOTIENT AND METABOLISM METER

Ira U. White, Hyattsville, and Roscoe G. Bartlett, Jr., Takoma Park, Md.

Application July 1, 1948, Serial No. 36,526

4 Claims. (Cl. 128—2.07)

This invention relates generally to clinical apparatus, and more particularly to metering means for obtaining the basic volumetric information required for calculating the respiratory quotient and/or the metabolic rate, the device being primarily designed for use with human patients.

A primary object of this invention is to provide metering means to provide basic volumetric information for calculating the respiratory quotient, as well as the metabolic rate, so that the physician or technician using the device will not be required to assume an arbitrary respiratory quotient, as is ordinarily done in making the final calculations of the metabolic rate. In other words, the exact respiratory quotient of the individual patient will be determined at the same time as the other necessary volumetric measurements are obtained. It follows, that a more accurate determination of the metabolism of the patient can be determined by the use of this device.

Another object of this invention is to provide a metering device in which a portion thereof may be rendered inactive, so that readings can be obtained to allow calculation of the metabolic rate, assuming an arbitrary respiratory quotient.

Still another object of this invention, allied to the preceding objects, is to provide apparatus which will permit the simultaneous measurement of both oxygen consumption and carbon dioxide production.

And a last object to be mentioned specifically is to provide a metering device of the general character mentioned above which is relatively inexpensive and practicable to manufacture, which is simple, safe, and very convenient to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawing which forms a material part of this application and in which:

The single figure is a completely diagrammatic representation of the arrangement of the elements in this device, a valve incorporated in the device being illustrated as positioned when the invention is not in use.

The characters of reference designate the same elements throughout the drawing and throughout the specification.

Referring now to the drawing in detail, it should first be understood that this invention is adapted to be used with an environment including any suitable complement of air cleaning devices, temperature control device, such as a water bath in which the connecting tubes and/or the meters may be partially or wholly immersed, and any suitable time measuring device to indicate the lapse of time during which a patient is operating the device.

The numeral 10 indicates any suitable tube or inlet for a gas meter 12, and it should be here stated that this gas meter 12 as well as the other meters to be mentioned hereinafter may be of any suitable type, provided that the resistance to flow of gas therethrough is reasonably small. A respiratory mask 14 for placement on the face of a patient is connected by a tube 16 to the outlet side of the gas meter 12 and another tube 18 is used to connect the respiratory mask on the outlet side thereof to a second gas meter 20.

This structure described immediately above comprises that part of this invention which is used to determine basic volumetric information required for calculating the metabolic rate when an estimated or an arbitrary respiratory quotient is used.

A tube 22 is connected to the outlet side of the second gas meter 20 and a three-way valve 24 is incorporated with this tube, this valve having a vent 26 and a tube 28 leading from the valve to a carbon dioxide absorbing chamber 30. This carbon dioxide absorbing chamber may be of conventional character, ordinarily employing alkalies into contact with which expired air is brought, and a tube 32 connects the said chamber with a third meter 34 which may be similar to the gas meters already mentioned and which will have an outlet 36 leading to the atmosphere.

When the device is used to obtain a respiratory quotient of a particular patient, the valve 24 will be turned so that the vent 26 is closed and the tube 22 is in communication with the tube 28. Air inspired through the gas meter 12 will be expired from the respiratory mask through the gas meter 20, the carbon dioxide absorbing chamber 30 and the third gas meter 34.

The operation of this invention will be reasonably clearly understood from a consideration of the foregoing description of the mechanical details thereof, taken in connection with the foregoing recitation of the objects sought to be achieved by this invention. Since the actual calculation of the metabolic rate, after the volumes of inspired and expired air is known, is well understood, no detailed description thereof would appear to be in place in this specification. When the respiratory quotient is arbitrarily taken as a particular value less than unity, the volumes of gas having passed through the meters 12 and 20 in a given length of time will be used to determine the volumes of carbon-dioxide and oxygen and the metabolic rate will be calculated therefrom. When it is desired first to determine the respiratory quotient, the difference in the readings obtained from the meters 12 and 34 will provide accurate determination of the volume of oxygen consumed. Mathematical compensation for the carbon dioxide in room air may be made as mentioned below. The difference in the readings of meters 20 and 34 will give the volume of carbon-dioxide absorbed in the chamber 20. Mathematical compensation for the small amount of carbon diovide in room air can be made and the amount of carbon dioxide produced will then be obtained, the carbon dioxide in the room air being subtracted from the total carbon dioxide absorbed to give the carbon dioxide produced. The respiratory quotient, that is, the volume of carbon-dioxide divided by the volume of oxygen, is thus obtained. This accurately determined respiratory quotient for the particular patient is used in calculating his metabolic rate, using the volumetric measurements obtained from the meters as already described. As mentioned above, a suitable means will be used to assure that the expired gases and the inspired gases are at approximately the same temperature, or proper corrections may be made to reduce all measurements so that the gases are calculated as at normal temperature and pressure.

Obviously many different types of meters, masks and carbon-dioxide absorbers may be used without departure from the spirit of this invention and the scope of this invention should be determined only by a proper interpretation of the subjoined claims.

Having described the invention, what is claimed as new is:

1. Apparatus to determine the respiratory quotient and the metabolic rate comprising a first gas meter to measure total inspired volume of air, a second gas meter to measure total expired volume of air, a respiratory mask operatively connected between said first and second meters, an outlet tube for said second meter, a carbon dioxide absorbing chamber having an inlet connected with said tube, a third meter having its inlet connected to the outlet side of said chamber, and a valve in said tube adapted for alternatively opening, closing and venting said tube.

2. Apparatus to determine the respiratory quotient and the metabolic rate comprising a first gas meter to measure total inspired volume of air, a second gas meter to measure total expired volume of air, a respiratory mask operatively connected between said first and second meters, an outlet tube for said second meter, a carbon dioxide absorbing chamber having an inlet connected with said tube, and a third meter having its inlet connected to the outlet side of said chamber.

3. Apparatus to determine the respiratory quotient and the metabolic rate comprising a first gas meter, a respiratory mask, a second gas meter, a tube having a valve to open and to close and to vent said tube alternatively, a carbon dioxide absorbing chamber and a third gas meter, said first meter, mask, second meter, tube, chamber and third meter being operatively connected in series in the order named.

4. Apparatus to determine the respiratory quotient and the metabolic rate comprising a first gas meter, a respiratory mask, a second gas meter, a tube having a valve to open and to close and to vent said tube alternatively, a carbon dioxide absorbing chamber and a third gas meter, said first meter, mask, second motor, tube, chamber and third meter being operatively connected in series in the order named, said second and third meters providing for reasonably accurate volumetric measurement of the carbon dioxide produced.

IRA U. WHITE.
ROSCOE G. BARTLETT, Jr.

REFERENCES CITED

The following references are of record in the file of this patent:

UNITED STATES PATENTS

| Number | Name | Date |
| --- | --- | --- |
| 1,550,335 | Benedict et al. | Aug. 18, 1925 |
| 1,863,929 | McKesson | June 21, 1932 |
| 1,988,221 | Soskin | Jan. 15, 1935 |
| 2,136,236 | Draper | Nov. 8, 1938 |
| 2,228,983 | Bloomheart | Jan. 14, 1941 |

OTHER REFERENCES

MacLeod: Physiology in Modern Medicine, 8th edition, 1938, pages 720–738. Copy in Div. 55.